United States Patent
Roques

(10) Patent No.: US 6,437,679 B1
(45) Date of Patent: Aug. 20, 2002

(54) DEVICE FOR TEMPERATURE DETERMINATION AND PROCESS FOR MANUFACTURING SUCH A DEVICE

(75) Inventor: Patrick Roques, Colomiers (FR)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/566,064

(22) Filed: May 5, 2000

(51) Int. Cl.⁷ .................................................. H01C 7/04
(52) U.S. Cl. ............................ 338/25; 338/28; 29/612; 374/208
(58) Field of Search ............................ 338/25, 28, 229; 29/612; 374/208

(56) References Cited

U.S. PATENT DOCUMENTS

| 3,147,457 A | * | 9/1964 | Gill et al. ..................... 338/28 |
| 4,243,968 A | * | 1/1981 | Scott .............................. 338/28 |
| 4,934,831 A | * | 6/1990 | Volbrecht .................... 374/183 |
| 5,481,240 A | * | 1/1996 | Fukaya et al. ................. 338/28 |
| 5,660,473 A | * | 8/1997 | Noma et al. ................. 374/208 |
| 5,743,646 A | * | 4/1998 | O'Connell et al. ......... 374/208 |
| 5,753,835 A | * | 5/1998 | Gustin .......................... 338/28 |

* cited by examiner

Primary Examiner—Karl D. Easthom
(74) Attorney, Agent, or Firm—Laurence A. Greenberg; Werner H. Stemer; Gregory L. Mayback

(57) ABSTRACT

A temperature sensor, of the type including a body (2) holding flat pin connection terminals (3, 3') connected to a sensitive element (4), which body is compound-filled in a cup (1), characterized in that the sensitive element is embedded in a thermal paste (5) that acts as a stop wall for the compound-filling material forming the body.

3 Claims, 1 Drawing Sheet

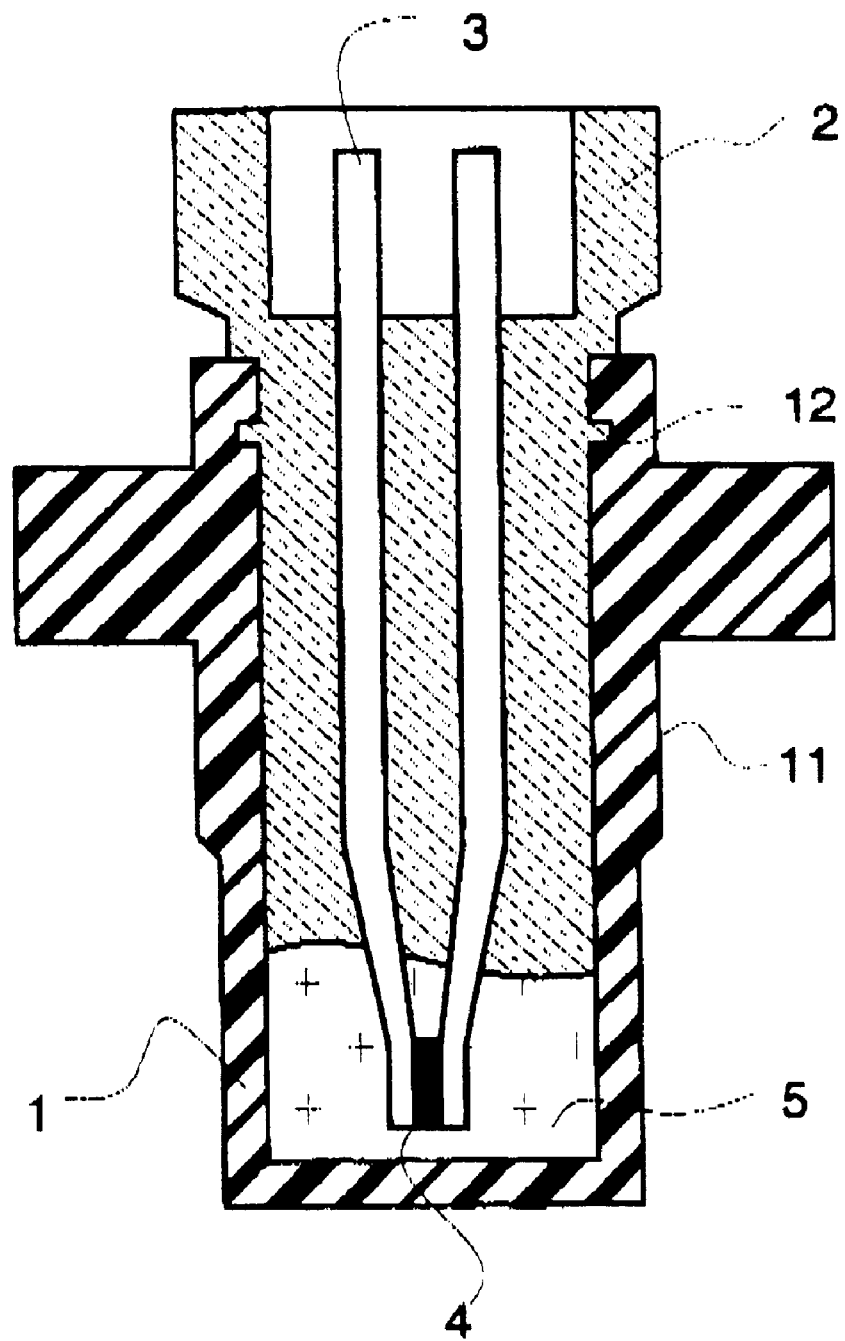

DEVICE FOR TEMPERATURE DETERMINATION AND PROCESS FOR MANUFACTURING SUCH A DEVICE

BACKGROUND OF THE INVENTION

Field of the Invention

The present invention relates to a temperature sensor of the type used in the automotive industry for measuring the temperature of the coolant fluid for an engine, and more particular such a sensor that has improved precision and reliability. The invention also relates to the method for producing such a sensor.

Temperature sensors for the coolant fluid for an engine are generally made up of a sensitive element, most often a thermistor, connected by flat pin connection terminals to an external electronic system. These flat pin connection terminals are held by a body of plastic material compound-filled around them to form a connector. From French Patent Application 2 719 115, a sensor of this type is known in which this compound-filling also includes the sensitive element and completely forms the sensor. When the sensor must be mounted in screwed fashion to the engine cylinder head, one may be led to compound-fill the body inside a metal cup that is partly or completely closed at its end that is in contact with the coolant liquid. When a closed cup is used, the heat transfer between the coolant liquid and the sensitive element is impaired by the interface between the metal of the cup and the plastic compound-filling material, as well as by this material itself, hence leading to a loss of precision and a poorer response time of the pickup. Furthermore, the rigidity of the cup and the compound-filling material and their different coefficients of expansion can lead to mechanical stresses on the sensitive element and its linkages with the flat pin connection terminals, thus causing breakdowns and impairing the reliability of the sensor.

SUMMARY OF THE INVENTION

It is accordingly the object of the present invention to overcome these disadvantages of the prior art. These objects of the invention, as well as others which will become apparent in the course of the present description, are attained by means of a temperature sensor, of the type including a body holding flat pin connection terminals connected to a sensitive element, which body is compound-filled in a cup, characterized in that the sensitive element is embedded in a thermal paste acting as a stop wall for the compound-filling material forming the body.

In an important characteristic of the present invention, the cup includes an anchoring groove of the compound-filling material forming the body.

The invention also relates to a method for producing a temperature sensor of this type, characterized in that, before the operation of compound-filling of the body, a thermal paste in a quantity sufficient to cover the sensitive element is placed at the bottom of the cup, which thermal paste serves a stop wall for the compound-filling material.

Further characteristics and advantages of the invention will become apparent from reading the ensuing description and studying the accompanying drawing, in which the sole FIGURE shows a sectional view of such a sensor.

BRIEF DESCRIPTION OF THE DRAWINGS

The FIGURE is a sectional view of a device for temperature determination according to the invention.

DESCRIPTION OF THE PREFERRED EMBODIMENT

In this drawing, a metal cup of substantially cylindrical shape is shown at 1; it is intended to be fixed to the cylinder head of an engine, for instance, by means of a thread 11. This cup can be made by screw cutting in a bar of brass or steel. A body 2 of plastic material (for instance, a polyamide) is formed, from the open side of cup, in the form of a connector that leaves the free end of two flat pin connection terminals 3 and 3' protruding. At its other end, the flat pin terminals clasp a sensitive element 4, in this case a thermistor in the shape of a disk, connected to the terminals by soldering. It can be seen that the sensitive element is embedded in a thermal paste 5, for example a silicone lubricant that is thermally conductive but electrically insulating. This thermal paste thus assures excellent thermal conduction between the closed wall of the cup in contact with the coolant liquid and the sensitive element 4, thus allowing precision of measurement. It can also be seen that in the lower part of the cup, the plastic material of the body 2, is stopped by contact with the thermal paste 5. Since the thermal paste is incompressible, it opposes the penetration of the plastic material during the compound-filling injection. As a result, the sensitive element 4 and its linkages to the flat pin connection terminals are located in a thermal paste that remains viscous, rather than in a rigid plastic material, and they accordingly escape from mechanical stresses. Also advantageously, since the plastic material is stopped before reaching the sensitive element, the sensitive element is unaffected by the high temperatures attained by the molten plastic material during the compound-filling operation.

It will also be noted in the drawing that the cup 1 is provided with at least one groove 12 hollowed out in the inside wall of the cup and extending over its circumference. This groove makes it possible to assure the anchoring of the body 2 in the cup and contributes to sealing off the sensitive element from the outside. Local variations (not shown) in the width of the anchoring groove 12 also make it possible to assure that the body 2 is prevented from rotating inside the cup 1.

When the sensor is made, a calibrated quantity of thermal paste 5 is placed on the bottom of the cup 1, for instance using an automatic distributor of the "syringe" type. This operation can advantageously be performed before the cup is inserted into a first part of the compound-filling mold. Upon the closure of the mold, the assembly comprising the sensitive element 4 and the flat pin connection terminals 3, 3' held by the free ends of the terminals in a complimentary part of the mold is plunged into the cup. The quantity of paste is calibrated in such a way that it covers the sensitive element in the closed position of the mold. When the compound-filling material is injected from the open side of the cup, the compound-filling material penetrates the cup and comes to a stop at the free surface of the paste, and then fills the cup and the anchoring groove 12 as well as the mold cavity, which is in the form of a connector, in order to make the body 2.

I claim:

1. In a temperature sensor of the type having a cup filled with a compound-filling material forming a body holding flat pin connection terminals connected to a sensitive element, the improvement which comprises: a thermal paste embedding said sensitive element adjacent said compound-filling material and forming a stop wall for said compound-filling material forming said body, said compound filling material being cooled from introduction against said stop wall in a molten state.

2. The temperature sensor according to claim 1, wherein said cup is formed with an anchoring groove in which said compound-filling material forming said body engages.

3. A method of producing a temperature sensor, comprising:
- providing a cup;
- placing a quantity of thermal paste in a bottom of the cup;
- forming a body holding flat pin connection terminals connected to a sensitive element by compound-filling the cup with a molten compound-filling material and thereby forming a stop wall against the compound-filling material with the thermal paste at the bottom of the cup, such that the thermal paste encases the sensitive element at the bottom of the cup when the body is formed.

\* \* \* \* \*